June 22, 1965   R. W. STOKES   3,190,286
FLEXIBLE VIEWING PROBE FOR ENDOSCOPIC USE
Filed Oct. 31, 1961

INVENTOR.
ROBERT W. STOKES
BY
ATTORNEYS

United States Patent Office 3,190,286
Patented June 22, 1965

3,190,286
FLEXIBLE VIEWING PROBE FOR ENDOSCOPIC USE
Robert W. Stokes, Macedon, N.Y., assignor to Bausch & Lomb Incorporated, Rochester, N.Y., a corporation of New York
Filed Oct. 31, 1961, Ser. No. 148,975
7 Claims. (Cl. 128—6)

This invention relates to a flexible probe and more particularly to a probe having a plurality of segments centered by the pivoting means.

The segmented flexible endoscope requires means for maintaining the alignment of the plurality of segments which form the hollow flexible tube. The tube carries an image transmitting means for transmitting an image from the point of examination to the point of visual observation. Previously the segments have been centered by the flexible members which applies a tensile force to flex the endoscope.

Accordingly, this invention is intended to provide a pivoting means which also maintains an alignment of the segments in the endoscope. The pivoting means is retained within recesses in the segments and thereby maintains an alignment as well as providing the desired pivoting action in the endoscope.

It is an object of this invention to provide a segmented probe with a plurality of small pivot elements intermediate the segments which operate as aligning means, and as a pivoting means in at least two planes.

It is another object of this invention to provide a segmented probe having pivot means serving as a pivoting means and as an aligning means for the segments of the probe.

It is a further object of this invention to provide a probe having a plurality of segments with pivot elements disposed intermediate the segments with openings in the segments and elements axially aligned to receive flexible members for flexing the probe in at least two planes.

The objects of this invention are accomplished by constructing a flexible probe of a plurality of serially aligned segments. Each of the segments is constructed with a plurality of axially parallel holes angularly spaced at approximately 90° from each other. A plurality of pivot elements are positioned intermediate the segments and partially received within recesses formed in the holes of said segments. A pair of elements with each of the elements diametrically opposed is positioned between adjacent segments. Alternate pairs of elements are angularly rotated relative to each other to permit a pivoting action in each of two planes normal to each other. The pivot elements are formed with openings having chamfered ends which receive a flexible member which operates as a control means in flexing the probe. The pivot elements permit the segments to tilt relative to each other as the flexible members are tightened thereby providing a flexing of the probe in any desired direction.

The foregoing and other objects of the invention will become apparent from the following detailed description of the represented embodiments illustrated in the drawings.

Figure 1:
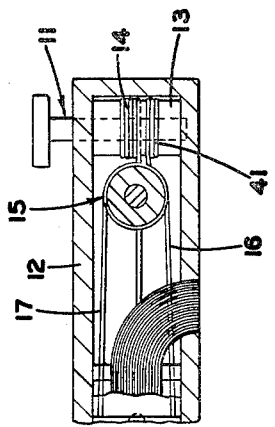
FIG. 1 is a cross section view showing the relative positions of the various parts in the probe.

Referring to the drawings, FIG. 1 illustrates the general layout of an endoscope. The basic components of the illuminating and image receiving portion is illustrated. The image is transmitted through a flexible bundle of fibers to a point of visual observation at the opposite end of the endoscope. A control means is also illustrated at the observation and which provides a means for flexing the intermediate portion of the endoscope.

The bulb 1 is mounted in the cup 2 within the housing 3. The bulb 1 is energized by the battery 4 through the leads connecting the filament in the bulb 1 to the terminals of the battery. The cup 2 within the housing 3 is mounted on the disc 5. The housing 3 is constructed of transparent material permitting a luminous flux to pass through the housing 3 for illumination of the object.

The mirror 6 is mounted within the housing 3 on the block 40. The mirror 6 receives an image illuminated by the bulb 1 of the object from a point radially outward of the mirror. A lens 7 projects an image on the planar surface 8 of the plurality of fibers 9. The fibers 9 are supported by the plate 10.

Referring to the opposite end of the endoscope a windlass 11 is mounted in the housing 12 having a drum 13 for winding of the flexible members 14 and 41. The flexible members 14 and 41 are constructed of wire and are wound on the drum 13 and fastened on the opposite ends to the plate 10.

A second windlass 15 is mounted at right angles to the windlass 11 and is connected to wires 16 and 17. The wires 14, 41, 16 and 17 extend longitudinally through the plurality of segments in the flexible portion of the endoscope. By changing the tension of the wire through rotation of the windlasses the endoscope is flexed in the desired direction. The control means including the windlasses and wires as illustrated is not intended to be limiting but is merely illustrative of a suitable means in controlling the flexing of the endoscope.

The intermediate portion of the endoscope is constructed in such a manner that the segments pivot relative to each other. The segments are encased within an elastomeric sheath 18. The bundle of fiber elements 9 extend through a cylindrical opening within the segments of the flexible portion.

Figure 2:
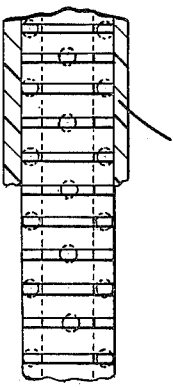
FIG. 2 is an enlarged cross section view of the flexible portion of the probe.
Figure 2:
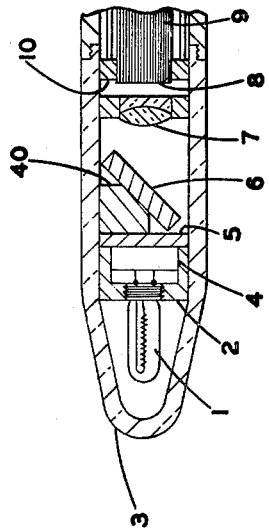
Figure 2:
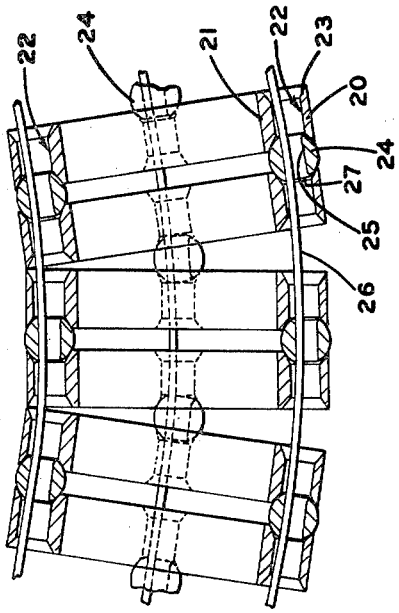

FIG. 2 is an enlarged cross section view of the segments and the pivot elements. Each of the segments 20 is formed with a central opening 21 to receive the bundle of fibers 9. The fibers are removed in FIG. 2 to more clearly show the flexible structure of the endoscope. Each of the segments 20 is formed with 4 holes 22 in the radially outer portion of a segment. Each of the holes 22 has a countersink portion 23 on each of its two ends.

The spherical pivot elements 24 are positioned diametrically opposite each other in the holes 22 in the segments 20. The holes in the segments which are angularly spaced 90° from the holes receiving the elements 24 do not contain pivot element between the same adjacent segments. The opposite ends of any segment pivot relative to the next adjoining segment in planes 90° relative to each other. The pivot elements are alternately spaced 90° between adjacent successive segments.

Each of the pivot elements 24 is formed with a central opening extending through the element. The central opening 25 in the element 24 has a chamfer 27 at each of its two ends to remove the burr and reduce the friction of the wire 26 as the wire is slid through the opening.

The hole 22 within the segment 20 is of a larger diameter than the opening 25 in the element 24. The countersink 23 in the hole 22 however is sufficiently large to receive a portion of the element 24 and thereby providing a pivoting surface on the wall of the countersink with the spherical surface of the element 24. The element 24 centers itself within the countersink portion of the hole 22 and causes the opening 25 to center itself relative to the hole 22 when the tensioning of the wire 26 in the element 24 essentially aligns itself in the hole 22 of the segments. This centering action is caused by the equal force on the portion on the wire 26 extending from opposite ends of the holes in the segments. The wire 26 extends between adjacent elements and through the hole 22 in the segments. The wire engages the segments by a limited contact due to the tension of the wires and smaller size of the openings 25 in the elements 24 relative to the holes 22. The chamfer 27 in the openings 25 eliminates any burrs and thereby reduces friction in the openings of the elements. A slight arcuate position is retained by the wire 26 due to the stiffness of the wire.

Figure 3:
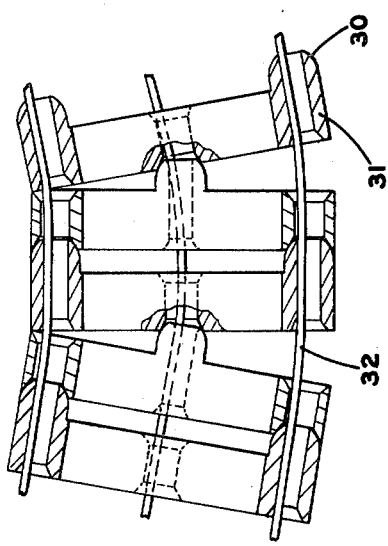
FIG. 3 is an enlarged cross section view of a modification where the pivot means is formed integral with the segment.

FIG. 3 illustrates the modification wherein the pivot elements formed by the spherical elements are replaced by a hemispherical portion 30 formed integral with the segment 31. The pivoting action of the segments relative to each other is in the same manner as illustrated in FIG. 2 except that the pivot means and segment are integral. The hemispherical surface operates as a ball in a socket on the base of the adjacent segment. The wires 32 provide the same tension in pivoting each segment relative to the adjacent segment. The advantage in construction of this type is in simplicity by eliminating the ball elements.

The operation of the device will be described in the following paragraphs. Referring to FIG. 2 the adjacent segments are permitted to pivot in planes perpendicular to each other. The first and second segments in FIG. 2 from the left hand side of the figure pivot in a plane normal to the surface of the paper. The second and third segments pivot in a plane parallel with the paper and in this manner permit the flexing of the segments on the pivot elements 24 in each of these two planes. While pivoting in each of two planes normal to each other a pivoting action similar to a universal joint is accomplished thereby permitting the flexing of an endoscope in any direction by combining the pivoting action in the two planes normal to each other. The elements 24 as illustrated are spherical and engage a surface on the countersink portion of the holes 22. The smooth spherical surface is in constant engagement with the countersink surface regardless of the degree of flexing of the segments. A tension is maintained on all of the wires 26 although the radially inner wire is the member causing the flexing motion in the view illustrated in FIG. 2. The wires 26 may be replaced with a cord or something of similar nature which does not have the characteristic of stiffness and thereby operate in flexing the endoscope. A wire is preferred in that it has a low coefficient of friction with a dissimilar alloy or metal. The ball 24 and segment 20 as illustrated may be constructed of a plastic material to provide lightness. If a metal is used it is desirable to use a light weight metal as an instrument of this type operates more satisfactory if the weight is kept to a minimum.

The device as illustrated provides pivoting elements 24 which are centered within the countersinks 23 of holes 22 and retained in this position with the tension of the wires 26. The elements 24 operate as pivoting elements as well as centering elements and also reduce the friction of the wire as the wires are moved within the openings of the elements 24 and the segment 20.

It is understood that the above described arrangement is illustrative and descriptive in setting forth the invention covered therein. Other modifications illustrated and describing this invention may be devised without departing from the spirit of the invention. The following attached claims are considered to cover the invention as described above.

What is claimed is:

1. A flexible tubular viewing probe comprising, a plurality of hollow segments coaxially aligned with each other, a pair of pivot elements positioned in alternate 90 degree angular relationship intermediate said segments, means defining pairs of diametrically opposed holes in 90 degree angularly spaced relationship with recessed portions in said segments receiving a portion of said pivot elements providing concentric alignment and pivoting means for adjacent segments, a plurality of flexible members extending longitudinally through said elements and said segments, fastening means on the forward end of said probe fastening said flexible members, and means tensioning said members for pivoting adjacent segments on said elements relative to each other and thereby providing means for flexing said probe.

2. A flexible tubular viewing probe comprising, a plurality of hollow segments arranged in a series relationship, means defining a plurality of pairs of holes formed in said segments angularly spaced relative to each other, at least two hollow pivot elements positioned in alternate angular relationship intermediate said segments and partially received in said holes in said segments for aligning said segments, a plurality of pairs of flexible members received in said hollow elements and in said holes in said segments, fastening means in said probe fastening one of the ends of said members, means connected to the other ends of said members to simultaneously apply and release tension on the first and the second of a pair of said members respectively thereby providing a pivoting action of said probe in at least two planes.

3. A flexible tubular viewing probe comprising, a plurality of hollow coaxially aligned segments, means defining at least two pairs of holes angularly spaced relative to each other with each of said holes in said pairs diametrically opposed relative to each other in said segments, a plurality of spherical elements partially received in said holes in said segments, means defining a plurality of central openings in each of said elements, said spherical elements constructed and arranged in pairs alternately angularly spaced relative to each other with a single pair between adjacent segments, a flexing control means extending through openings in said spherical elements and holes in said segments, fastening means in said probe fastening the ends of said control means to thereby provide a pivoting action of said segments relative to each other in at least two planes responsive to operation of said control means.

4. A flexible tubular viewing probe comprising a plurality of hollow segments serially arranged relative to each other, means defining a plurality of pairs of holes in said segments with each of said pairs located in intersecting planes relative to each other and passing through the center of said segments, a single pair of hollow spherical pivot elements positioned between adjacent of said segments angularly displaced from the preceding pair of elements and partially received in a pair of said holes in said segments and aligning said segments, flexible members received within said pivot elements and said holes in said segments fastened to one end of said probe and maintaining axial contact of said elements with said segments, means simultaneously alternately applying and releasing tension on the one and the other member of said pair respectively in a plane to thereby provide a means for flexing said probe in at least two planes.

5. A flexible tubular viewing probe comprising, a plurality of hollow segments serially and concentrically arranged relative to each other, means defining a plurality of pairs of 90 degree angularly spaced holes positioned axially in said segments with said holes of said pairs positioned diametrically opposite each other in a diametric plane, a single pair of hemispherical portions extending from each segment in alternate 90 degree angular relationship and partially received in a pair of said holes of an adjacent segment to provide a pivoting and centering action relative to an adjacent segment, flexible control means connected to the end of said probe and extending through said holes in said segments to the opposite end of said probe thereby providing a means for pivoting adjacent segments about pairs of hemispherical portions on said segments in response to operation of said control means.

6. A flexible tubular viewing probe comprising a plurality of hollow segments serially arranged relative to each other, means defining a plurality of pairs of holes having an axial center parallel with the axial center of said segments with each pair of holes angularly spaced relative to each other, a single pair of hemispherical portions on each of said segments partially received within a pair of holes with alternate pairs of hemispherical portions on any segment angularly rotated relative to the hemispherical portions on the preceding segment, control means connected to the end of said probe and extending longitudinally through said holes in said segments to thereby provide a means for pivoting alternate adjacent segments on pairs of hemispherical portions through intersecting planes for flexing of said probe.

7. A flexible tubular viewing probe comprising, a plurality of hollow segments serially arranged relative to each other, means defining at least two pairs of diametrically opposed holes formed in said segments angularly spaced relative to each other and extending longitudinally through said segments, a plurality of hollow pivot elements constructed and arranged in pairs aligning said segments with a single pair positioned between adjacent segments and partially received in a pair of said holes with alternate of said pairs of elements angularly spaced relative to the preceding pair, means connected to the end of said probe extending through each of said segments and said elements biasing said elements and segments to a contacting position between adjacent elements and segments and providing a means to cause the pivoting of adjacent segments in a plane intersecting the plane of alternate adjacent segments for flexing said probe.

References Cited by the Examiner

UNITED STATES PATENTS

| | | | |
|---|---|---|---|
| 616,672 | 12/98 | Kelling | 128—8 |
| 1,276,117 | 8/18 | Riebe | 138—120 |
| 1,485,394 | 3/24 | Haynes | 138—120 |
| 1,905,824 | 4/33 | Dysthe | 138—120 |
| 2,799,274 | 7/57 | Eisenhut | 128—356 |
| 2,975,785 | 3/61 | Sheldon | 128—6 |
| 3,060,972 | 10/62 | Sheldon | 138—120 |
| 3,096,962 | 7/63 | Meijs | 138—120 X |

FOREIGN PATENTS

| | | |
|---|---|---|
| 198,137 | 5/23 | Great Britain. |
| 548,462 | 10/42 | Great Britain. |

RICHARD A. GAUDET, *Primary Examiner.*

RICHARD J. HOFFMAN, *Examiner.*